US008751239B2

(12) United States Patent
Tian et al.

(10) Patent No.: US 8,751,239 B2
(45) Date of Patent: Jun. 10, 2014

(54) METHOD, APPARATUS AND COMPUTER PROGRAM PRODUCT FOR PROVIDING TEXT INDEPENDENT VOICE CONVERSION

(75) Inventors: Jilei Tian, Tampere (FI); Victor Popa, Tampere (FI); Jani K. Nurminen, Lempaala (FI)

(73) Assignee: Core Wireless Licensing, S.a.r.l., Luxembourg (LU)

( * ) Notice: Subject to any disclaimer, the term of this patent is extended or adjusted under 35 U.S.C. 154(b) by 1105 days.

(21) Appl. No.: 11/867,196

(22) Filed: Oct. 4, 2007

(65) Prior Publication Data

US 2009/0094031 A1 Apr. 9, 2009

(51) Int. Cl.
*G10L 13/00* (2006.01)

(52) U.S. Cl.
USPC ........... 704/269; 704/258; 704/260; 704/261; 704/266

(58) Field of Classification Search
USPC .......................... 704/269, 260, 266, 258, 261
See application file for complete search history.

(56) References Cited

U.S. PATENT DOCUMENTS

| 7,664,645 | B2 * | 2/2010 | Hain et al. ............... | 704/269 |
|---|---|---|---|---|
| 2003/0115059 | A1 | 6/2003 | Jayaratne | |
| 2007/0168189 | A1 * | 7/2007 | Tamura et al. .......... | 704/235 |
| 2010/0198600 | A1 * | 8/2010 | Masuda .................. | 704/278 |

FOREIGN PATENT DOCUMENTS

JP WO/2007/063827 * 6/2007

OTHER PUBLICATIONS

David Sunderman et al.; *Text-Independent Cross-Language Voice Conversion*; Proceedings of the International Conference on Acoustics, Speech and Signaling Processing (ICASSP); May 2006; Toulouse, France.
David Sunderman et al.; *Text-Independent Cross-Language Voice Conversion*; Interspeech, 2006; Pittsburgh, Pennsylvania.
H. Duxans, D. Erro, J. Perez, F. Diego, A. Bonafonte and A. Moreno, "Voice Conversion of Non-aligned Data Using Unit Selection," TALP Research Center, Barcelona, Spain (6 pages).
H. Duxans, D. Erro, J. Perez, F. Diego, A. Bonafonte and A. Moreno, "Voice Conversion of Non-aligned Data Using Unit Selection," TALP Research Center, Barcelona, Spain (6 pages), Jun. 19-21, 2006.
A. Kain and M. Macon, "Spectral Voice Conversion for Text-to-speech Synthesis," Center for Spoken Language Understanding, Oregon Graduate Institute of Science and Technology, Portland, Oregon, IEEE, 1998, pp. 285-288.

* cited by examiner

*Primary Examiner* — Qi Han (57) ABSTRACT

An apparatus for providing text independent voice conversion may include a first voice conversion model and a second voice conversion model. The first voice conversion model may be trained with respect to conversion of training source speech to synthetic speech corresponding to the training source speech. The second voice conversion model may be trained with respect to conversion to training target speech from synthetic speech corresponding to the training target speech. An output of the first voice conversion model may be communicated to the second voice conversion model to process source speech input into the first voice conversion model into target speech corresponding to the source speech as the output of the second voice conversion model.

25 Claims, 5 Drawing Sheets

METHOD, APPARATUS AND COMPUTER PROGRAM PRODUCT FOR PROVIDING TEXT INDEPENDENT VOICE CONVERSION

FIELD OF THE INVENTION

Embodiments of the present invention relate generally to voice conversion technology and, more particularly, relate to a method, apparatus and computer program product for providing voice conversion that is text independent.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many applications, it is necessary for the user to receive audio information such as oral feedback or instructions from the network. An example of such an application may be paying a bill, ordering a program, receiving driving instructions, etc. Furthermore, in some services, such as audio books, for example, the application is based almost entirely on receiving audio information. It is becoming more common for such audio information to be provided by computer generated voices. Accordingly, the user's experience in using such applications will largely depend on the quality and naturalness of the computer generated voice. As a result, much research and development has gone into speech processing techniques in an effort to improve the quality and naturalness of computer generated voices.

Examples of speech processing include speech coding and voice conversion related applications. Voice conversion, for example, may be used to modifying speaker identity. In this regard, speech uttered by a source speaker may be converted in order to sound like a different speaker (e.g., a target speaker) uttered the speech. Algorithms have been developed for the performance of voice conversion using a conversion function having parameters that are estimated based on a corpus of matching words or phrases (i.e., a parallel corpus) that are spoken by both speakers. This may be accomplished, for example, by asking the source speaker and the target speaker to each recite the same sentences. However, depending upon the target speaker's identity and other factors, it may sometimes be difficult or impossible to collect a parallel corpus sufficient for voice conversion between a particular pair of source and target speakers. Furthermore, free speech (i.e., unscripted speech) recorded from either the source or target speaker is often not useful for use in voice conversion, since there is not necessarily a match between the words and/or phrases spoken by the source and target speakers in free speech.

Due to the difficulties described above, attempts have been made to develop voice conversion techniques that do not rely upon a parallel corpus for training. For example, mechanisms that require a parallel corpus for training are often referred to as being text dependent, since the sentences spoken for the training data are limited to provide the parallel corpus. Text independent voice conversion generally refers to voice conversion in which there is no limitation to the sentences that the source and/or target speakers read or speak for the training. However, to date, voice conversion techniques that do not rely on a parallel corpus for training typically perform worse than parallel corpus schemes. Furthermore, such schemes typically require linguistic knowledge for system tuning and very large databases in order to find parallel subunits from both source and target speakers within a certain context.

Particularly in mobile environments, increases in memory consumption directly affect the cost of devices employing such methods. Thus, it may be desirable to develop an improved mechanism for performing voice conversion without a need for a parallel corpus and without a need for large databases for identifying parallel subunits. Moreover, even in non-mobile environments, an improved mechanism for performing voice conversion without a need for a parallel corpus may be desirable.

BRIEF SUMMARY OF THE INVENTION

A method, apparatus and computer program product are therefore provided that may enable text independent voice conversion. In an exemplary embodiment, a synthetic speaker may be used for intermediate conversion between source and target speakers during voice conversion. As such, a text independent voice conversion mechanism may be provided that can work for any source and any target rather than being useful only for a specific source to target conversion. In an exemplary embodiment, two cascaded voice conversions may be provided in which the first conversion converts source speech to synthetic speech and the second conversion converts synthetic speech to target speech. Accordingly, an improved text independent voice conversion may be provided.

In one exemplary embodiment, a method for providing text independent voice conversion is provided. The method may include processing source speech at a first voice conversion model trained with respect to conversion of training source speech to synthetic speech corresponding to the training source speech, communicating an output of the first voice conversion model to a second voice conversion model trained with respect to conversion to training target speech from synthetic speech corresponding to the training target speech, and processing the output of the first voice conversion model at the second voice conversion model to produce target speech corresponding to the source speech.

In another exemplary embodiment, a computer program product for providing text independent voice conversion is provided. The computer program product includes at least one computer-readable storage medium having computer-readable program code portions stored therein. The computer-readable program code portions include first, second and third executable portions. The first executable portion is for processing source speech at a first voice conversion model trained with respect to conversion of training source speech to synthetic speech corresponding to the training source speech. The second executable portion is for communicating an output of the first voice conversion model to a second voice conversion model trained with respect to conversion to training target speech from synthetic speech corresponding to the training target speech. The third executable portion is for processing the output of the first voice conversion model at the second voice conversion model to produce target speech corresponding to the source speech.

In another exemplary embodiment, an apparatus for providing text independent voice conversion is provided. The apparatus may include a first voice conversion model and a second voice conversion model. The first voice conversion model may be trained with respect to conversion of training source speech to synthetic speech corresponding to the training source speech. The second voice conversion model may be trained with respect to conversion to training target speech from synthetic speech corresponding to the training target speech. An output of the first voice conversion model may be communicated to the second voice conversion model to process source speech input into the first voice conversion model into target speech corresponding to the source speech as the output of the second voice conversion model.

In another exemplary embodiment, an apparatus for providing text independent voice conversion is provided. The apparatus includes means for processing source speech at a first voice conversion model trained with respect to conversion of training source speech to synthetic speech corresponding to the training source speech, means for communicating an output of the first voice conversion model to a second voice conversion model trained with respect to conversion to training target speech from synthetic speech corresponding to the training target speech and means for processing the output of the first voice conversion model at the second voice conversion model to produce target speech corresponding to the source speech.

In yet another exemplary embodiment, a method of training models for providing text independent voice conversion is provided. The method may include converting text corresponding to training source speech to synthetic speech corresponding to the training source speech, training a first voice conversion model with respect to converting source speech to first synthetic speech based on the training source speech and the synthetic speech corresponding to the training source speech, converting text corresponding to training target speech to synthetic speech corresponding to the training target speech, and training a second voice conversion model with respect to converting second synthetic speech to target speech based on the training target speech and the synthetic speech corresponding to the training target speech.

Embodiments of the present invention may enable relatively high quality voice conversion with improved usability over existing methods. Accordingly, text independent voice conversion may be provided for multiple source and target speakers using the same conversion mechanism.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
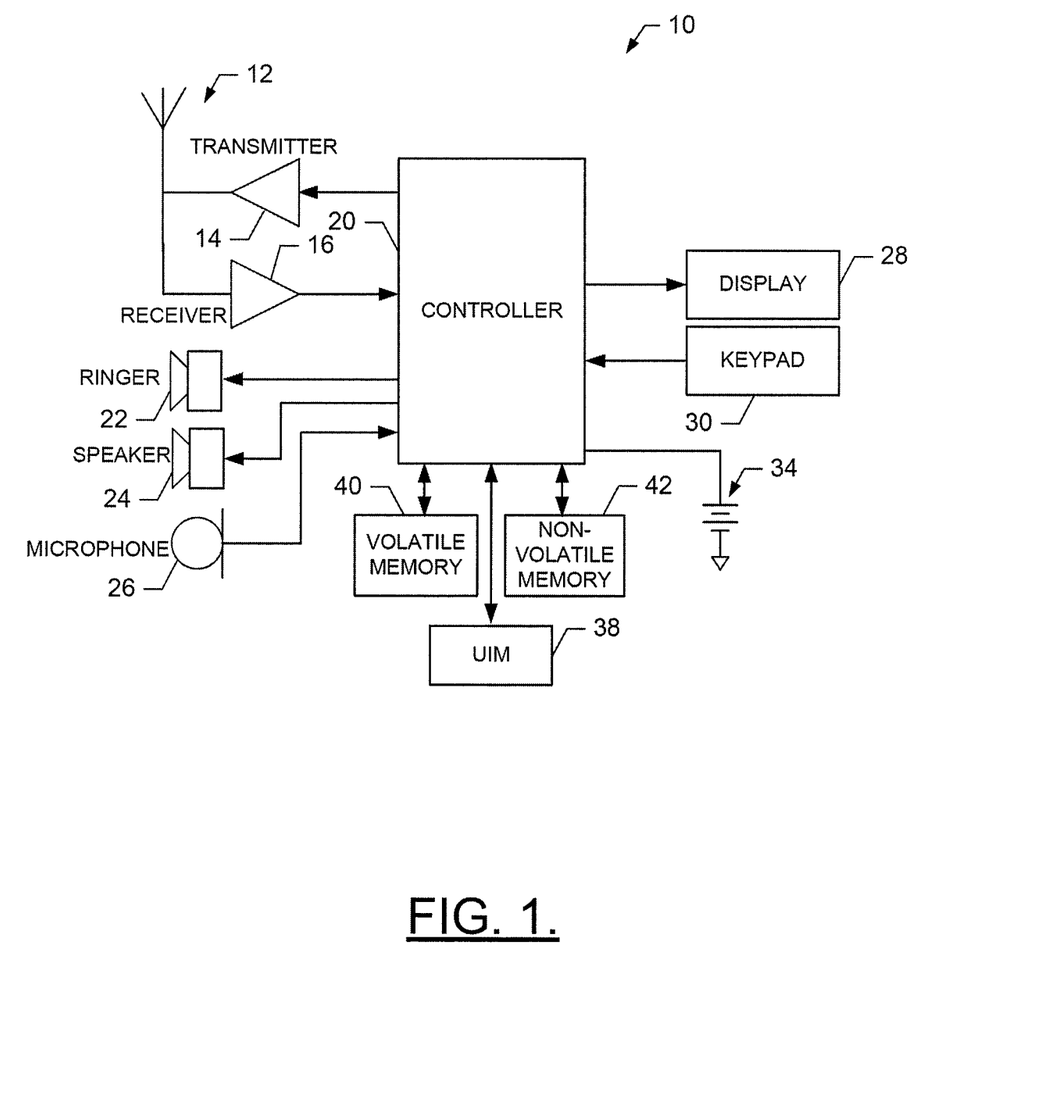
FIG. 1 is a schematic block diagram of a mobile terminal according to an exemplary embodiment of the present invention.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication.

Figure 2:
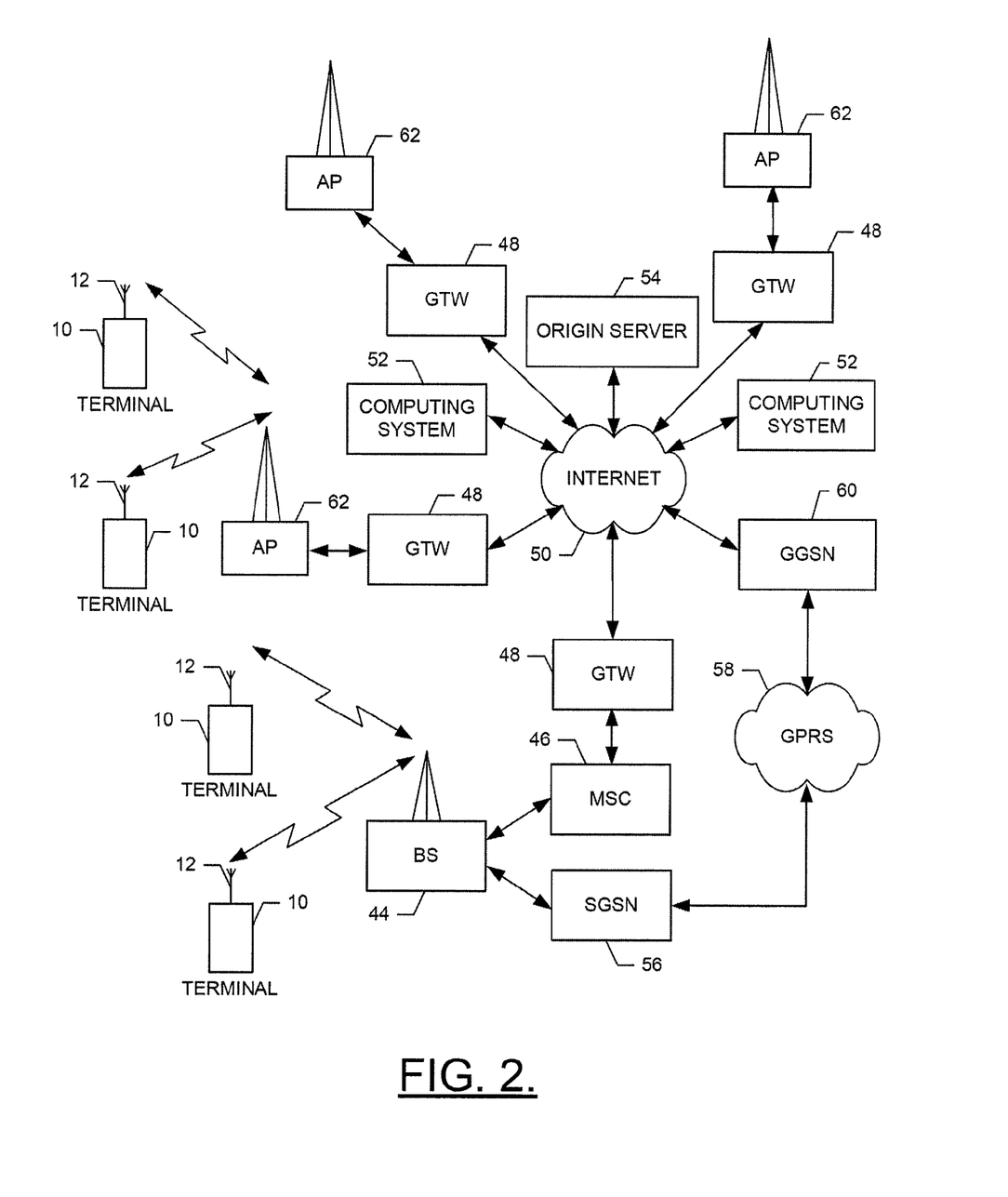
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, data associated with a spoken language interface may be communicated over the system of FIG. 2 between a mobile terminal, which may be similar to the mobile terminal 10 of FIG. 1 and a network device of the system of FIG. 2, or between mobile terminals. Alternatively, for example, voice conversion as provided hereinafter could alternatively be practiced at the mobile terminal 10 (or another device) for conversion and/or use at the mobile terminal 10 (or another device) without communication of any data over the system of FIG. 2. As such, it should be understood that the system of FIG. 2 need not be employed for communication between the server and the mobile terminal, but rather FIG. 2 is merely provided for purposes of example. Furthermore, it should be understood that embodiments of the present invention may be resident on a communication device such as the mobile terminal 10, or may be resident on a network device or other device accessible to the communication device.

Figure 3:
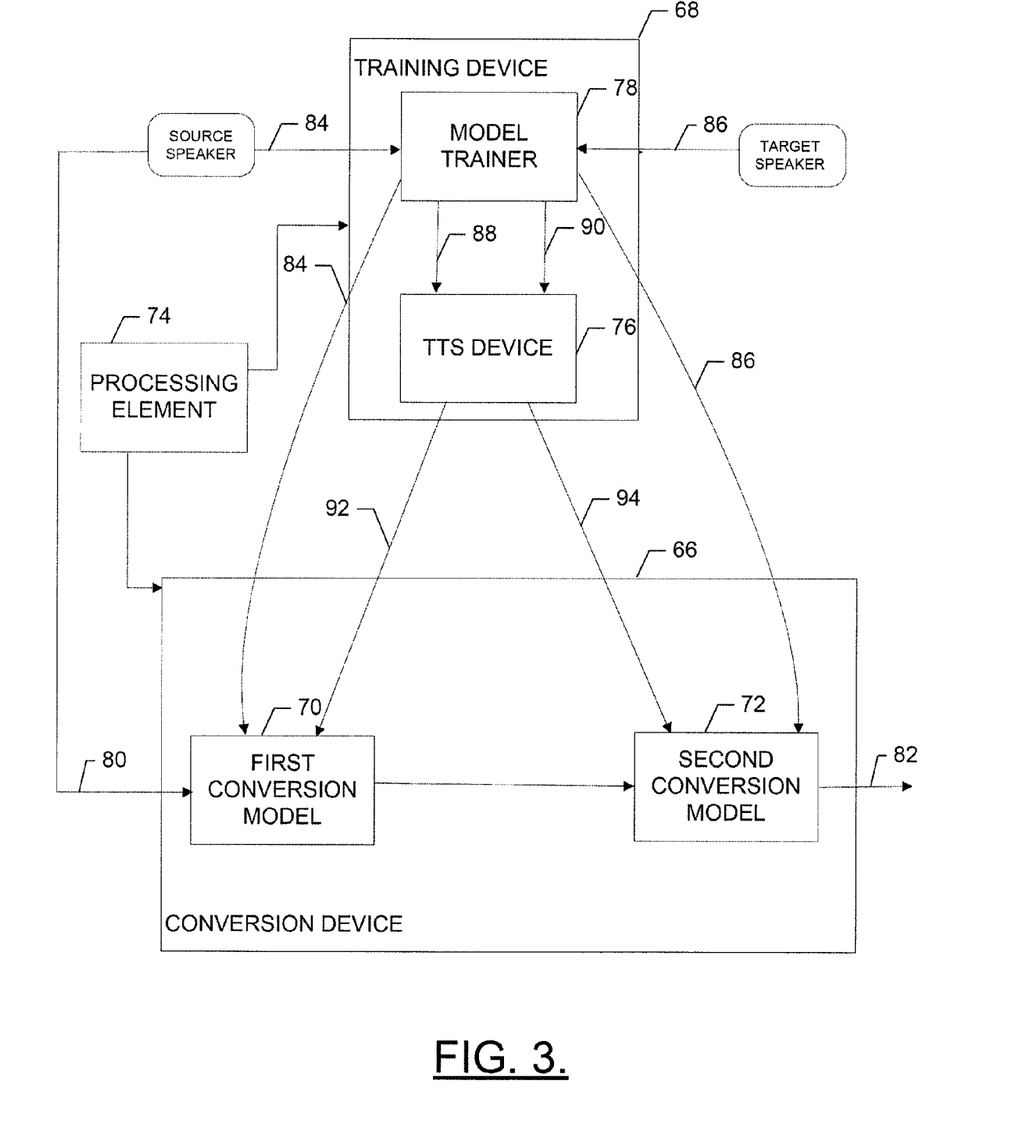
FIG. 3 illustrates a block diagram showing an apparatus for providing text independent voice conversion according to an exemplary embodiment of the present invention.

FIG. 3 illustrates a block diagram of an apparatus for providing text independent voice conversion according to an exemplary embodiment of the present invention. An exemplary embodiment of the invention will now be described with reference to FIG. 3, in which certain elements of an apparatus for providing text independent voice conversion are displayed. The apparatus of FIG. 3 will be described, for purposes of example, in connection with the mobile terminal 10 of FIG. 1. However, it should be noted that the system of FIG. 3, may also be employed in connection with a variety of other devices, both mobile and fixed, and therefore, embodiments of the present invention should not be limited to application on devices such as the mobile terminal 10 of FIG. 1. It should also be noted, that while FIG. 3 illustrates one example of a configuration of a system for providing text independent voice conversion, numerous other configurations may also be used to implement embodiments of the present invention.

An exemplary embodiment of the present invention will now be described with reference to FIG. 3, in which certain elements of an apparatus for providing an improved text independent voice conversion mechanism are displayed. The apparatus of FIG. 3 may be employed, for example, on the mobile terminal 10 of FIG. 1 and/or the computing system 52 or the origin server 54 of FIG. 2. However, it should be noted that the system of FIG. 3, may also be employed on a variety of other devices, both mobile and fixed, and therefore, the present invention should not be limited to application on devices such as the mobile terminal 10 of FIG. 1.

Referring now to FIG. 3, an apparatus for providing text independent voice conversion is provided. The apparatus may include a conversion device 66, a training device 68 and a processing element 74. Each of the conversion device 66 and the training device 68 may be any device or means embodied in either hardware, software, or a combination of hardware and software capable of performing the respective functions associated with each of the corresponding devices as described below. In an exemplary embodiment, the conversion device 66 and the training device 68 may be embodied in software as instructions that are stored on a memory of the mobile terminal 10 and executed by the controller 20. It should be noted that although FIG. 3 illustrates the training device 68 as being a separate element from the conversion device 66, the conversion device 66 and the training device 68 may also be collocated or embodied in a single module or device capable of performing the functions of both the conversion device 66 and the training device 68. Alternatively, the training device 68 and the conversion device 66 could be located in separate devices in communication with each other either continuously or intermittently (e.g., only when training is needed).

The conversion device 66 may be capable of transforming source speech 80 into target speech 82. In this regard, the conversion device 66 may be employed to build transformation models which may essentially include one or more trained Gaussian mixture models (GMMs) for transforming the source speech 80 into the target speech 82. In order to produce the transformation models, GMMs may be trained using training source speech data 84 and training target speech data 86 to determine corresponding conversion functions with respect to corresponding intermediate synthetic speech as described below.

In an exemplary embodiment, the conversion device 66 may include a first conversion model 70 and a second conversion model 72 and the training device 66 may include a model trainer 78 and a text-to-speech (TTS) device 76. In an exemplary embodiment, the model trainer 78 and the TTS device 76 may each be any means or device embodied in hardware, software or a combination of hardware and software that is configured to perform the corresponding functions of the model trainer 78 and the TTS device 76, respectively, as described below. In one embodiment, the model trainer 78 and/or the TTS device 76 may be controlled by or otherwise embodied as the processing element 74 (e.g., the controller 20 of the mobile terminal 10 or a processor of a server, computer or other device). As such, control circuitry of the apparatus, e.g., the processing element 74, may comprise means for performing the corresponding functions of the model trainer 78 and/or the TTS device 76. Processing elements such as those described herein may be embodied in many ways. For example, the processing element may be embodied as a processor, a coprocessor, a controller or various other processing means or devices including integrated circuits such as, for example, an ASIC (application specific integrated circuit).

In an exemplary embodiment, the first conversion model 70 and the second conversion model 72 may each be any type of model or algorithm configured to perform the conversion functions described herein. In this regard, for example, the first and second conversion models 70 and 72 may be embodied as GMMs. More specifically, the first conversion model may be embodied as a first voice conversion GMM for transforming source speech into synthetic speech, while the second conversion model may be embodied as a second voice conversion GMM for transforming synthetic speech into target speech. More detailed examples of the first and second conversion models 70 and 72 will be provided below for purposes of example and not limitation. As such, voice conversion using techniques other than GMMs may also be employed in accordance with embodiments of the present invention.

The TTS device 76 may be utilized to provide a conversion between text and synthetic speech. TTS is the creation of audible speech from computer readable text. TTS is often considered to consist of two stages. First, a computer examines the text to be converted to audible speech to determine specifications for how the text should be pronounced, what syllables to accent, what pitch to use, how fast to deliver the sound, etc. Next, the computer tries to create audio that matches the specifications. However, any mechanism for converting from text to synthetic speech may be utilized in embodiments of the present invention. The synthetic speech generated by the TTS device 76 may be utilized by both the first and second conversion models 70 and 72 as described in greater detail below.

The TTS device 76 may be any means such as any device or circuitry known in the art for producing synthesized speech from computer text. As such, elements of the TTS device 76 of FIG. 3 are merely exemplary and the descriptions provided below are given merely to explain an operation of the TTS device 76 in general terms for the sake of clarity. The TTS device 76 may, in one embodiment, include a text processor, a prosodic processor and an acoustic synthesizer. The text processor may receive an input text and begin processing the input text before communicating processed text to the prosodic processor. The text processor can perform any of numerous processing operations known in the art. The text processor may include a table or other means to correlate a particular text word or sequence of letters with a particular specification or rule for pronunciation. The prosodic processor may analyze the processed text to determine specifications for how the text should be pronounced, what syllables to accent, what pitch to use, how fast to deliver the sound, etc. The acoustic synthesizer may then produce a synthetically created audio output in the form of computer generated speech. The acoustic synthesizer may apply stored rules or models to an input from the prosodic processor to generate synthetic speech that audibly reproduces the computer text in a way that conforms to the specifications determined by the prosodic processor. The synthetic speech may then be communicated to an output device such as an audio mixer for appropriate mixing prior to delivery to another output device such as a speaker, or as in this case, a voice conversion model.

The model trainer 78 may be any means or device embodied in hardware, software or a combination of hardware and software that is configured to apply training data for use in the first and second conversion models 70 and 72. In this regard, as shown in FIG. 3, the model trainer 78 may be configured to receive training source speech data 84 from a source speaker and training target speech data 86 from a target speaker. The training source speech data 84 and the training target speech data 86 may each be, for example, samples of spoken syllables, words, phrases, or sentences from the source speaker and target speaker, respectively. In an exemplary embodiment, the training source speech data 84 and the training target speech data 86 may comprise non-parallel corpuses of training speech. In other words, the syllables, words, phrases, or sentences from the source speaker need not match with the syllables, words, phrases, or sentences from the target speaker.

In an exemplary embodiment, the model trainer 78 may also be configured to provide, to the TTS device 76, training source text 88 corresponding to the training source speech data 84 and training target text 90 corresponding to the training target speech. In this regard, for example, the model trainer 78 could receive or generate text information corresponding to the training source text 88 and/or the training target text 90. If the training source text 88 and/or the training target text 90 are generated at the model trainer 78, the generation thereof may be accomplished by a speech recognition device configured to receive the training source speech data 84 and the training target speech data 86, recognize text within the training source speech data 84 and the training target speech data 86, respectively, and generate the respective training source text 88 and the training target text 90 based on the recognized text. The speech recognition may be accomplished by any known method. Meanwhile, if the training source text 88 and/or the training target text 90 are received at the model trainer 78, the training source text 88 and/or the training target text 90 may be received from a known script corresponding to the training source speech data 84 and the training target speech data 86, respectively. Alternatively, manual recognition (e.g., by a human listening to the training source speech data 84 and/or the training target speech data 86 and making corresponding text entries) of the text corresponding to the training source speech data 84 and/or the training target speech data 86 may be done by a user or other entity and text corresponding to the recognized speech may be provided or stored as the training source text 88 and the training target text 90. As an alternative, the model trainer 78 could communicate the training source speech data 84 and the training target speech data 86 to the TTS device 76 or to another device, and the TTS device 76 or other device may include functionality for converting speech to text or receiving the corresponding training source text 88 and training target text 90.

Once in receipt of the training source text 88 and the training target text 90, the TTS device 76 may be configured to produce parallel training source synthetic speech 92 corresponding to the training source text 88 and parallel training target synthetic speech 94 corresponding to the training target text 90. The training source synthetic speech 92 may then be provided to the first conversion model 70 and the training target synthetic speech 94 may be provided to the second conversion model 72 (e.g., under the control of the model trainer 78 or the processing element 74).

Having received the parallel training source speech data 84 and the training source synthetic speech 92, the first conversion model 70 may determine a conversion function for transforming source speech into synthetic speech as a result of the training of the first conversion model 70. Likewise, having received the parallel training target speech data 86 and the training target synthetic speech 94, the second conversion model may determine a conversion function for transforming synthetic speech into target speech as a result of the training of the second conversion model. As a result, once both the first and second conversion models 70 and 72 have been trained, which may be done offline if desired; the first and second conversion models 70 and 72 may be concatenated together as indicated in FIG. 3 in order to provide a mechanism for text-independent source to target voice conversion. In this regard, the first conversion model 70 may convert source speech into intermediate synthetic speech that may then be converted to corresponding target speech by the second conversion model. Thus, embodiments of the present invention may provide a source-to-TTS voice conversion stage concatenated with a TTS-to-target voice conversion stage in which the text (and therefore the corresponding training speech) corpuses need not be parallel. GMMs associated with the first and second conversion models may therefore, for example, be combined to a compound GMM for conversion between source and target speech.

An exemplary embodiment will now be described in greater detail with respect to exemplary GMMs that may be employed and the determination of corresponding conversion functions associated therewith. In this regard, training of a GMM model (e.g., the first conversion model 70) for conversion between source and synthetic speech is described below. A probability density function (PDF) of a GMM distributed random variable v can be estimated from a sequence of v samples $[v_1\ v_2\ \ldots\ v_t\ \ldots\ v_p]$ provided that a dataset is long enough as determined by one skilled in the art, by use of classical algorithms such as, for example, expectation maximization (EM). In a particular case when $v=[x^T\ z^T]^T$ is a joint variable, the distribution of v can serve for probabilistic mapping between the variables x and z. Thus, in an exemplary voice conversion application, x and z may correspond to similar features from a source speaker X and synthetic speaker Z, respectively. For example, x and z may correspond to a line spectral frequency (LSF) extracted from the given short segment of the speeches of the source and synthetic speaker, respectively.

The distribution of v may be modeled by GMM as in Equation (1).

$$P(v) = P(x, z) = \sum_{l=1}^{L} c_l \cdot N(v, \mu_l, \Sigma_l) \qquad (1)$$

where $c_l$ is the prior probability of v for the component $$\left( \sum_{l=1}^{L} c_l = 1 \right.$$

and $c_l \geq 0$), L denotes a number of mixtures, and $N_{XZ}(v, \mu_l, \Sigma_l)$ denotes Gaussian distribution with a mean $\mu_l$ and a covariance matrix $\Sigma_l$. Parameters of the GMM can be estimated using the EM algorithm. For the actual transformation, what is desired is a function $F_{XZ}(.)$ such that the transformed $F_{XZ}(x_t)$ best matches the target $z_t$ for all data in a training set. The conversion function that converts source feature $x_t$ to synthetic feature $z_t$ is given by Equation (2).

$$F_{XZ}(x_t) = E(z_t|x_t) = \sum_{l=1}^{L} p_l(x_t) \cdot (\mu_l^z + \Sigma_l^{zx}(\Sigma_l^{xx})^{-1}(x_t - \mu_l^x)) \quad (2)$$

$$p_i(x_t) = \frac{c_i \cdot N(x_t, \mu_i^x, \Sigma_i^{xx})}{\sum_{l=1}^{L} c_l \cdot N(x_t, \mu_l^x, \Sigma_l^{xx})}$$

Weighting terms $p_i(x_t)$ are chosen to be the conditional probabilities that the source feature vector $x_t$ belongs to the different components.

Training of a GMM model (e.g., the second conversion model 72) for conversion between the synthetic speaker Z and target speaker Y is described below. Similarly, the GMM model for synthetic to target conversion can also be trained as $N_{ZY}(v, \mu_l, \Sigma_l)$. The conversion function that converts synthetic feature $z_t$ to target feature $y_t$ is given by Equation (3).

$$F_{ZY}(z_t) = E(y_t|z_t) = \sum_{l=1}^{L} p_l(z_t) \cdot (\mu_l^y + \Sigma_l^{yz}(\Sigma_l^{zz})^{-1}(z_t - \mu_l^z)) \quad (3)$$

$$p_i(z_t) = \frac{c_i \cdot N(z_t, \mu_i^z, \Sigma_i^{zz})}{\sum_{l=1}^{L} c_l \cdot N(z_t, \mu_l^z, \Sigma_l^{zz})}$$

Weighting terms $p_i(z_t)$ are chosen to be the conditional probabilities that the synthetic feature vector $z_t$ belongs to the different components.

A GMM model between non-parallel utterances from the source speaker X to the target speaker Y can then be derived by concatenating the models above: $N_{XZ}(v, \mu_l, \Sigma_l)$ and $N_{ZY}(v, \mu_l, \Sigma_l)$. Accordingly, the conversion function that converts source feature $x_t$ to target feature $y_t$ is given by Equation (4).

$$z_t = F_{XZ}(x_t) = E(z_t|x_t) = \sum_{l=1}^{L} p_l(x_t) \cdot (\mu_l^z + \Sigma_l^{zx}(\Sigma_l^{xx})^{-1}(x_t - \mu_l^x)) \quad (4)$$

$$\text{where} \ldots p_i(x_l) = \frac{c_i \cdot N(x_l, \mu_i^x, \Sigma_i^{xx})}{\sum_{l=1}^{L} c_l \cdot N(x_t, \mu_l^x, \Sigma_l^{xx})}$$

$$y_t = F_{ZY}(z_t) = E(z_t|x_t) = \sum_{l=1}^{L} p_l(z_t) \cdot (\mu_l^y + \Sigma_l^{yz}(\Sigma_l^{zz})^{-1}(z_t - \mu_l^z))$$

$$\text{where} \ldots p_i(z_t) = \frac{c_i \cdot N(z_t, \mu_i^z, \Sigma_i^{zz})}{\sum_{l=1}^{L} c_l \cdot N(z_t, \mu_l^z, \Sigma_l^{zz})}$$

Accordingly, non-parallel voice conversion may be accomplished between the source speaker X and the target speaker Y. Moreover, the same TTS device may be used for voice conversions between one or more additional speaker with additional training corresponding to the applicable conversions between the speakers, but without requiring generation of a new TTS device.

In an exemplary embodiment, for example, in order to perform a transformation at the conversion device 66, a GMM such as that given by Equation (2) may be initially trained by the model trainer 78 for source to synthetic voice conversion and another GMM such as that given by Equation (3) may be initially trained by the model trainer 78 for synthetic to target voice conversion. In this regard, the model trainer 78 may receive training data including the training source speech data 84 and the training target speech data 86. In an exemplary embodiment, the training data may be representative of, for example, audio corresponding to a given number of utterances spoken by a source voice and a potentially different given number of potentially different utterances spoken by a target voice which may be stored, for example, in a database, or gathered from free speech recorded from the source or target, respectively. In an exemplary embodiment, the training source and target speech data 84 and 86 may be converted to text as described above and the text may be used for synthetic speech generation for training the models described above. Concatenation of the models may provide a text independent voice conversion from source to target speech.

Figure 4:
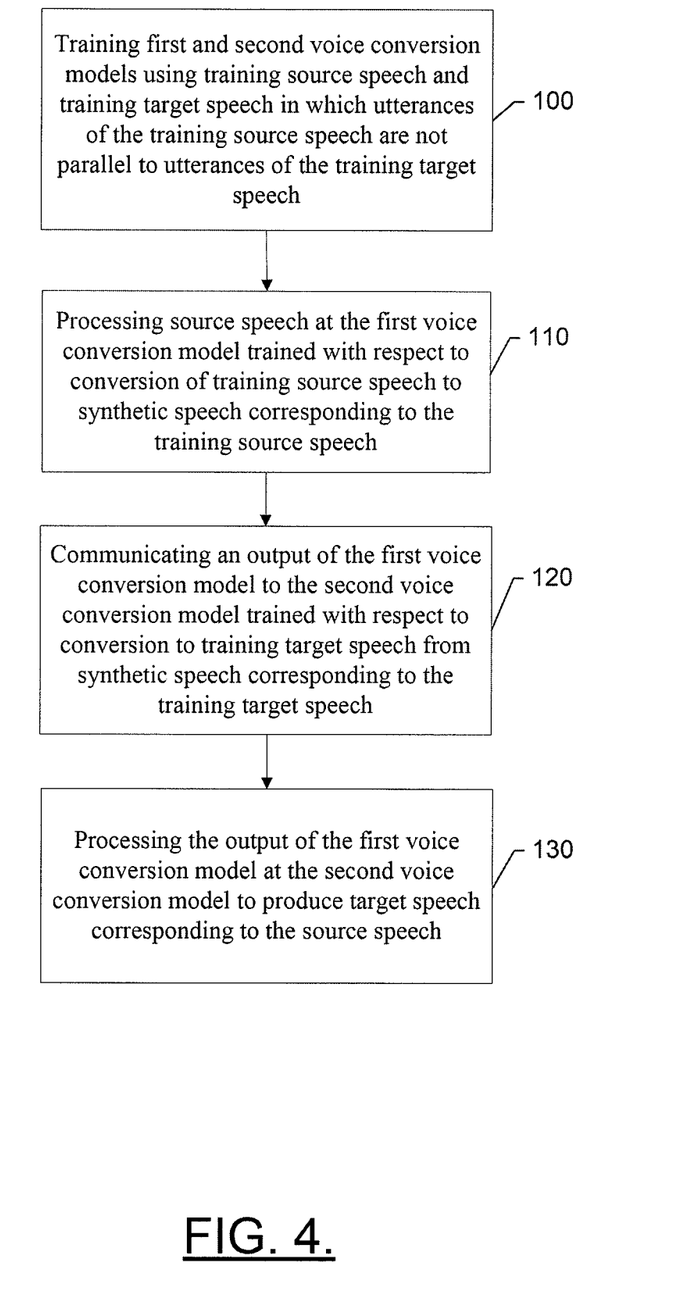
FIG. 4 is a block diagram according to an exemplary method of providing text independent voice conversion according to an exemplary embodiment of the present invention.
Figure 5:
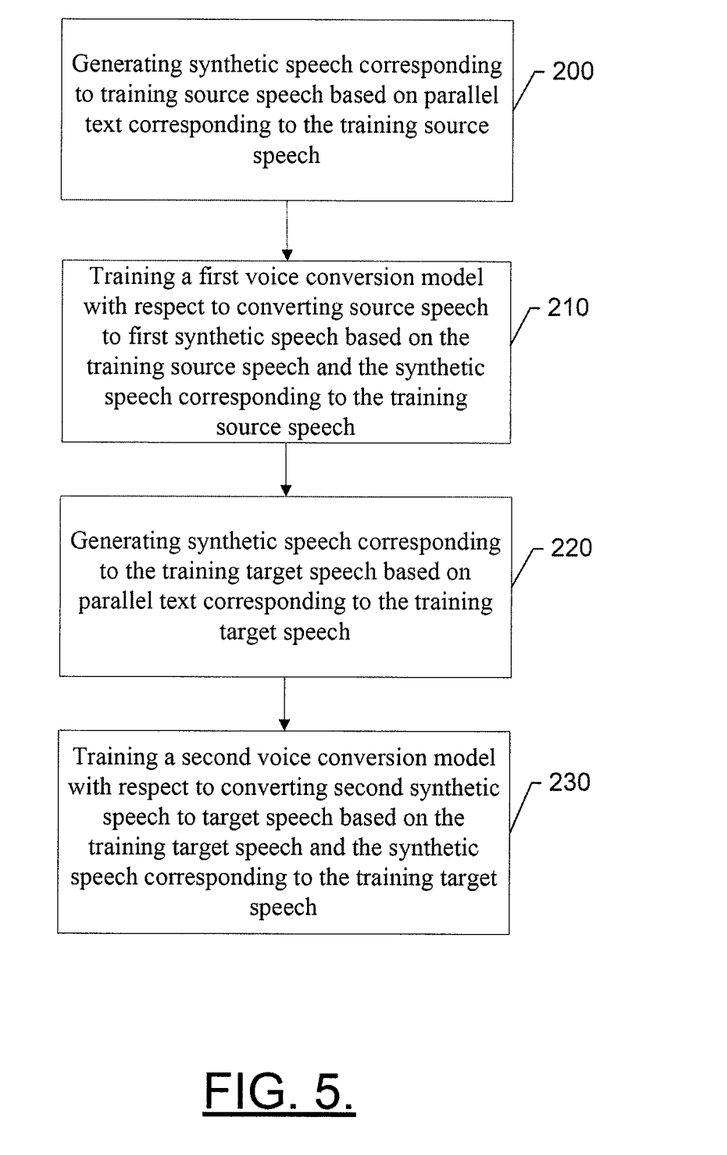
FIG. 5 illustrates a method of training models for providing text independent voice conversion in accordance with an embodiment of the present invention.

FIGS. 4 and 5 are flowcharts of methods and program products according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing text independent voice conversion, as illustrated in FIG. 4 may include processing source speech at a first voice conversion model trained with respect to conversion of training source speech to synthetic speech corresponding to the training source speech at operation 110. An output of the first voice conversion model may then be communicated to a second voice conversion model trained with respect to conversion to training target speech from synthetic speech corresponding to the training target speech at operation 120. At operation 130, the output of the first voice conversion model may be processed at the second voice conversion model to produce target speech corresponding to the source speech. In an exemplary embodiment, the operations above may follow an optional initial operation of training the first and second voice conversion models using the training source speech and the training target speech in which utterances of the training source speech are not parallel to utterances of the training target speech at operation 100. Operation 100 may be optional since the operation may already be previously completed offline prior to execution of operations 110 to 130.

In an exemplary embodiment, operation 100 may include training the first voice conversion model to convert the training source speech to the synthetic speech corresponding to the training source speech in which the synthetic speech is generated by a text-to-speech device having parallel text corresponding to the training source speech. Alternatively, operation 100 may include training the second voice conversion model for conversion to the training target speech from the synthetic speech corresponding to the training target speech in which the synthetic speech is generated by a text-to-speech device having parallel text corresponding to the training target speech.

In an exemplary embodiment, operation 110 may include converting the source speech to intermediate synthetic speech based on the first voice conversion model. Meanwhile, operation 130 may include converting the intermediate synthetic speech to the target speech based on the second voice conversion model and operation 120 may include concatenating the first and second voice conversion models.

FIG. 5 illustrates a method of training first and second voice conversion models in accordance with an embodiment of the present invention. As indicated in FIG. 5, the method may include generating synthetic speech based on parallel text corresponding to training source speech at operation 200. At operation 210, a first voice conversion model may be trained with respect to converting source speech to first synthetic speech based on the training source speech and the synthetic speech corresponding to the training source speech. Synthetic speech may be generated based on parallel text corresponding to training target speech at operation 220. The method may further include training a second voice conversion model with respect to converting second synthetic speech to target speech based on the training target speech and the synthetic speech corresponding to the training target speech at operation 230. In an exemplary embodiment, a further operation of concatenating the first and second voice conversion models may be performed in order to enable the production of the target speech corresponding to input source speech.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    training, at a user terminal, a first voice conversion model with respect to a training source speech of a first speaker and a second voice conversion model with respect to a training target speech of a second speaker;
    wherein training the first voice conversion model further comprises determining a first conversion function for transforming any source speech into corresponding synthetic speech, the first conversion function receiving the training source speech of the first speaker and a training source synthetic speech of the first speaker as inputs, and
    wherein training the second voice conversion model further comprises determining a second conversion function for transforming synthetic speech into corresponding target speech, the second conversion function receiving the training target speech of the second speaker and a training target synthetic speech of the second speaker as inputs, and wherein said training target synthetic speech is produced from said training target speech;
    processing, at the user terminal, source speech of the first speaker using the first voice conversion model to convert the source speech to synthetic speech; and
    processing, at the user terminal, an output of the first voice conversion model at the second voice conversion model to produce target speech corresponding to the source speech.

2. The method of claim 1, wherein utterances of the training source speech are not parallel to utterances of the training target speech.

3. The method of claim 2, wherein training the first voice conversion model further comprises training the first voice conversion model to convert the training source speech to synthetic speech corresponding to the training source speech in which the synthetic speech is generated by a text-to-speech device having parallel text corresponding to the training source speech.

4. The method of claim 2, wherein training the second voice conversion model comprises training the second voice conversion model for conversion to the training target speech from synthetic speech corresponding to the training target speech in which the synthetic speech is generated by a text-to-speech device having parallel text corresponding to the training target speech.

5. The method of claim 1, wherein processing the source speech at the first voice conversion model comprises converting the source speech to intermediate synthetic speech based on the first voice conversion model.

6. The method of claim 5, wherein processing the output of the first voice conversion model comprises converting the intermediate synthetic speech to the target speech based on the second voice conversion model.

7. The method of claim 1, further comprising concatenating the first and second voice conversion models.

8. A computer program product comprising at least one computer-readable storage medium having computer-readable program code portions stored therein, the computer-readable program code portions comprising:
    a first executable portion for training, at a user terminal, a first voice conversion model with respect to a training source speech of a first speaker and a second voice conversion model with respect to a training target speech of a second speaker;
    wherein training the first voice conversion model further comprises determining a first conversion function for transforming any source speech into corresponding synthetic speech, the first conversion function receiving the training source speech of the first speaker and a training source synthetic speech of the first speaker as inputs, and
    wherein training the second voice conversion model further comprises determining a second conversion function for transforming synthetic speech into corresponding target speech, the second conversion function receiving the training target speech of the second speaker and a training target synthetic speech of the second speaker as inputs, and wherein said training target synthetic speech is produced from said training target speech;

a second executable portion for processing, at the user terminal, source speech using the first voice conversion model to convert the source speech to synthetic speech; and a third executable portion for processing, at the user terminal, an output of the first voice conversion model at the second voice conversion model to produce target speech corresponding to the source speech.

9. The computer program product of claim 8, wherein utterances of the training source speech are not parallel to utterances of the training target speech.

10. The computer program product of claim 9, wherein the first executable portion further comprises instructions for training the first voice conversion model to convert the training source speech to synthetic speech corresponding to the training source speech in which the synthetic speech is generated by a text-to-speech device having parallel text corresponding to the training source speech.

11. The computer program product of claim 9, wherein the third executable portion includes instructions for training the second voice conversion model for conversion to the training target speech from synthetic speech corresponding to the training target speech in which the synthetic speech is generated by a text-to-speech device having parallel text corresponding to the training target speech.

12. The computer program product of claim 8, wherein the first executable portion includes instructions for converting the source speech to intermediate synthetic speech based on the first voice conversion model.

13. The computer program product of claim 12, further comprising a fourth executable portion comprising instructions for converting the intermediate synthetic speech to the target speech based on the second voice conversion model.

14. The computer program product of claim 8, wherein the second executable portion includes instructions for concatenating the first and second voice conversion models.

15. An apparatus comprising a processor and memory storing computer program code, the memory and computer program code configured to, with the processor cause the apparatus at least to:

train, at a user terminal, a first voice conversion model with respect to a training source speech of a first speaker and a second voice conversion model with respect to a training target speech of a second speaker;

wherein training the first voice conversion model further comprises determining a first conversion function for transforming any source speech into corresponding synthetic speech, the first conversion function receiving the training source speech of the first speaker and a training source synthetic speech of the first speaker as inputs, and wherein training the second voice conversion model further comprises determining a second conversion function for transforming synthetic speech into corresponding target speech, the second conversion function receiving the training target speech of the second speaker and a training target synthetic speech of the second speaker as inputs, and wherein said training target synthetic speech is produced from said training target speech;

process, at the user terminal, source speech of the first speaker using the first voice conversion model to convert the source speech to synthetic speech; and process, at the user terminal, an output of the first voice conversion model at the second voice conversion model to produce target speech corresponding to the source speech.

16. The apparatus of claim 15, wherein utterances of the training source speech are not parallel to utterances of the training target speech.

17. The apparatus of claim 16, further comprising a text-to-speech device in communication with the first and second voice conversion models and wherein the memory and the computer program code are further configured to, with the processor, cause the apparatus to train the first voice conversion model to convert the training source speech to synthetic speech corresponding to the training source speech in which the synthetic speech is generated by the text-to-speech device having parallel text corresponding to the training source speech.

18. The apparatus of claim 16, further comprising a text-to-speech device in communication with the first and second voice conversion models and wherein the memory and the computer program code are further configured to, with the processor, cause the apparatus to train the second voice conversion model for conversion to the training target speech from synthetic speech corresponding to the training target speech in which the synthetic speech is generated by the text-to-speech device having parallel text corresponding to the training target speech.

19. The apparatus of claim 15, wherein the memory and the computer program code are further configured to, with the processor, cause the apparatus to convert the source speech to intermediate synthetic speech based on the first voice conversion model.

20. The apparatus of claim 19, wherein the memory and the computer program code are further configured to, with the processor, cause the apparatus to convert the intermediate synthetic speech to the target speech based on the second voice conversion model.

21. The apparatus of claim 15, wherein the first and second voice conversion models are concatenated.

22. An apparatus comprising:

means for training, at a user terminal, a first voice conversion model with respect to a training source speech of a first speaker and a second voice conversion model with respect to a training target speech of a second speaker;

wherein training the first voice conversion model further comprises determining a first conversion function for transforming any source speech into corresponding synthetic speech, the first conversion function receiving the training source speech of the first speaker and a training source synthetic speech of the first speaker as inputs, and wherein training the second voice conversion model further comprises determining a second conversion function for transforming synthetic speech into corresponding target speech, the second conversion function receiving the training target speech of the second speaker and a training target synthetic speech of the second speaker as inputs; and wherein said training targets synthetic speech is produced from said training target speech;

means for processing, at the user terminal, source speech of the first speaker using the first voice conversion model to convert the source speech to synthetic speech; and means for processing, at a user terminal, an output of the first voice conversion model at the second voice conversion model to produce target speech corresponding to the source speech.

23. The apparatus of claim 22, wherein utterances of the training source speech are not parallel to utterances of the training target speech.

24. A method comprising;
- generating, at a user terminal, synthetic speech corresponding to training source speech based on parallel text corresponding to the training source speech;
- training a first voice conversion model with respect to converting source speech to first synthetic speech based on the training source speech and the synthetic speech corresponding to the training source speech, the first voice conversion model being trained at the user terminal;
- wherein training the first voice conversion model further comprises determining a first conversion function for transforming any source speech into corresponding synthetic speech, the first conversion function receiving the training source speech of the first speaker and a training source synthetic speech of the first speaker as inputs, and
- generating, at the user terminal, synthetic speech corresponding to the training target speech based on parallel text corresponding to the training target speech; and
- training a second voice conversion model with respect to converting second synthetic speech to target speech based on the training target speech and the synthetic speech corresponding to the training target speech, the second voice conversion model being trained at the user terminal,
- wherein training the second voice conversion model further comprises determining a second conversion function for transforming synthetic speech into corresponding target speech, the second conversion function receiving the training target speech of the second speaker and training target synthetic speech of the second speaker as inputs and wherein said training target synthetic speech is produced from said training target speech.

25. The method of claim 24, further comprising concatenating the first and second voice conversion models to enable the production of the target speech corresponding to input source speech.

* * * * *